(12) United States Patent
Binder et al.

(10) Patent No.: US 7,579,548 B2
(45) Date of Patent: *Aug. 25, 2009

(54) ADAPTER FOR MOUNTING A FACEPLATE OF A FIRST STYLE TO AN ELECTRICAL OUTLET CAVITY OF A SECOND STYLE

(75) Inventors: Yehuda Binder, Hod Hasharon (IL); Ami Hazani, Ra'anana (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/955,024

(22) Filed: Dec. 12, 2007

(65) Prior Publication Data

US 2008/0128148 A1 Jun. 5, 2008

Related U.S. Application Data

(63) Continuation of application No. 11/716,683, filed on Mar. 12, 2007, now Pat. No. 7,342,174, which is a continuation of application No. 11/453,831, filed on Jun. 16, 2006, now Pat. No. 7,196,266, which is a continuation of application No. 11/006,582, filed on Dec. 8, 2004, now Pat. No. 7,109,418, which is a continuation of application No. 10/451,544, filed as application No. PCT/IL01/00896 on Sep. 25, 2001, now Pat. No. 6,927,340.

(51) Int. Cl.
  *H02G 3/14* (2006.01)
(52) U.S. Cl. .................... 174/66; 174/67; 220/241; 33/528; 312/328
(58) Field of Classification Search ............ 174/66, 174/67; 220/241, 242; 33/528; 312/328; D8/353; D13/177
  See application file for complete search history.

(56) References Cited

U.S. PATENT DOCUMENTS 5,224,868 A * 7/1993 Tseng .................... 439/136

(Continued)

FOREIGN PATENT DOCUMENTS

DE 43 11 137 A1 10/1994

(Continued)

OTHER PUBLICATIONS

Strassberg, Dan; "Home Automation Buses: Protocols Really Hit Home"; EDN Design Feature, Apr. 13, 1995 (9 pages).
Hachman, Mark; "Compaq to Ride The CEBus"; EBN Jan. 22, 1996 (1 page).
Hoffman, J.; "Cable, Television, and the Consumer Electronic Bus"; Panasonic Technologies. Inc., pp. 165-173.

(Continued)

*Primary Examiner*—Dhiru R Patel
(74) *Attorney, Agent, or Firm*—Browdy and Neimark, P.L.L.C.

(57) ABSTRACT

An adapter for mounting electrical outlet faceplates designed for mounting on rectangular junction boxes in hollow walls onto solid walls with cylindrical cavities and sleeves. Junction box mounting is popular in North America, whereas cavity mounting is popular in Europe and the Middle East. Such an adapter provides universal mounting for specialized faceplates which are designed and intended for junction box mounting. The adapter features clamps for gripping the inner surface of a wall cavity or sleeve and a rectangular plate for mounting an faceplate designed for junction box mounting. The rectangular plate has mounting points with a nominal center-to-center distance of 3¼ inches, corresponding to the requirements of junction box mounting.

18 Claims, 7 Drawing Sheets

U.S. PATENT DOCUMENTS

| | | | |
|---|---|---|---|
| 5,539,821 A * | 7/1996 | Blonder | 379/446 |
| 5,841,360 A | 11/1998 | Binder | |
| 6,184,468 B1 | 2/2001 | Speziale | |
| 6,373,944 B1 | 4/2002 | Beavers | |
| 6,396,391 B1 | 5/2002 | Binder | |
| 6,480,510 B1 | 11/2002 | Binder | |
| 6,549,616 B1 | 4/2003 | Binder | |
| 6,560,319 B1 | 5/2003 | Binder | |
| 6,690,677 B1 | 2/2004 | Binder | |
| 6,842,459 B1 | 1/2005 | Binder | |
| 6,937,056 B2 | 8/2005 | Binder | |
| 6,956,826 B1 | 10/2005 | Binder | |
| 6,961,303 B1 | 11/2005 | Binder | |
| 7,106,721 B1 | 9/2006 | Binder | |
| 7,183,487 B1 * | 2/2007 | O'Young et al. | 174/66 |
| 7,193,154 B1 * | 3/2007 | Connelly et al. | 174/67 |
| 7,214,878 B2 * | 5/2007 | Dinh | 174/66 |
| 2004/0125819 A1 | 7/2004 | Binder | |
| 2005/0047431 A1 | 3/2005 | Binder | |

FOREIGN PATENT DOCUMENTS

| | | |
|---|---|---|
| DE | 195 36 943 A | 4/1997 |
| DE | 299 07 456 U1 | 7/1999 |
| WO | WO 98/54806 | 12/1998 |

OTHER PUBLICATIONS

Grayson Evans, The CEBus Standard User's Guide, 1st edition, May 1996, 317 pages.

IS-60.04; Node Communications Protocol Part 6: Application Layer Specification; Revision Apr. 18, 1996 (129 pages).

Markwalter, Brian et al; "CEBus Router Testing"; IEEE Transactions on Consumer Electronics Nov. 1991, vol. 37 No. 4 (8 pages).

* cited by examiner

ADAPTER FOR MOUNTING A FACEPLATE OF A FIRST STYLE TO AN ELECTRICAL OUTLET CAVITY OF A SECOND STYLE

CROSS REFERENCE TO RELATED APPLICATIONS

This is a continuation of copending application Ser. No. 11/716,683, filed on Mar. 12, 2007, now allowed, which is a continuation of application Ser. No. 11/453,831, filed on Jun. 16, 2006, now U.S. Pat. No. 7,196,266, which is a continuation of application Ser. No. 11/006,582, now U.S. Pat. No. 7,109,418, which is itself a continuation of parent application Ser. No. 10/451,544, nationalized Jun. 24, 2003, which parent application is the national stage of international application PCT/IL01/00896, filed Sep. 25, 2001, and is now U.S. Pat. No. 6,927,340, issued on Aug. 9, 2005. The above-identified applications are incorporated herein by reference.

FIELD OF THE INVENTION

The present invention relates to a mechanical mounting adapter for electrical fixtures and the like, and, more particularly, to a wall mounting adapter for outlets and similar fixtures.

BACKGROUND OF THE INVENTION

Wall outlets for electrical apparatus and the like are in widespread use, allowing convenient connection of devices such as electrical appliances, telephones, cable television receivers, and computers to electrical power mains and communication networks. In addition, similar fixtures are often attached to walls, floors, and ceilings, and are connected in like manner to electrical power and communications networks. The term "wall" herein denotes any fixed surface to which socket outlets are commonly connected and includes, without limitation, walls of a building or similar structure regardless of orientation (including, but not limited to vertical walls, as well as floors and ceilings), as well as surfaces of other structures to which socket outlets may be fixed, such as cupboards and desk tops particularly when fixedly mounted in a room. Likewise, the term "outlet" herein denotes a non-limiting instance of a fixture for attachment to a wall or other fixed structure, enabling access to in-wall wiring, commonly via faceplate panel connector. Other fixture types include, but are not limited to, wall-mounted electrical lighting and appliances, controls, switches, sensors, data devices, telephony equipment, and intercommunication devices. Outlets commonly uses in-wall dedicated cavity, but some types are surface-mount, fully installed over the wall surface.

Outlets commonly comprise two distinct parts:

(a) Faceplate. The outer part of the outlet, commonly formed of plastic and comprising a front panel accommodating a standard connector for connecting to the in-wall wiring. The front panel of the faceplate is usually decorative, being the only exposed outlet part after the installation.

(b) Wall mounting fixture. This fixture is mechanically attached to the wall on the wall inner side, and is attached to the faceplate on the wall outer side thereby fixing the outlet to the wall. Commonly, the faceplate is attached to the wall-mounting fixture be means of two screws.

There are two principal outlet types that are in common use, depending on the style of wall construction and the opportunities consequently available for mechanically attaching fixtures to a wall and providing electrical or signal connections thereto.

One such wall mounting fixture system is the "junction box" style as illustrated in FIG. 1. The junction box style is common in North America and is used with a hollow wall construction in which a wall section 101 is held in place and supported by a support beam 103, wherein such support beams are placed at suitable intervals. Typically, wall section 101 may be a relatively thin panel of gypsum or other material (approximately one-half inch thick), and the support beam 103 is usually of wood or metal. A rectangular junction box 105 is securely fastened to the support beam 103, but may alternatively be affixed to any other suitable supporting structure. The junction box 105 has an open face 107, which is exposed through a matching opening cut into the wall section 101. Commonly, the junction box 105 is made of metal or plastic, although other suitable materials may be employed. Mounting tabs 109-a and 109-b are provided on opposing sides of the face 107 and accommodate threaded mounting holes 111-a and 111-b allowing the attachment of various electrical fixtures to the junction box 105. It is to be noted that the nominal center distance between the mounting holes 111-a and 111-b is substantially three and one-quarter (3¼ inches. Media 113 enters the junction box 105, optionally via a conduit (not shown), which connects to the junction box 105 in one of several optional apertures (not shown) in the closed faces. Media 113 can carry electrical power, telephony signals, or other signals for sensing, data, or control. Any number of media 113 can be used, and can include different combinations and configurations of electrical conductors, such as wires or coaxial cable; or non-conducting media, such as optical fiber.

FIG. 2 illustrates how a faceplate 201 (or similar fixture) is mounted according to the junction box system (wall section 101 in FIG. 1 is omitted for clarity). Screws 203-a and 203-b affix faceplate 201 to junction box 105 through the mounting holes 111-a and 111-b, respectively. Because junction box 105 is secured to the support beam 103 (or other suitable supporting structure), the faceplate 201 is thereby securely fastened in place. Faceplate 201 comprises two telephony connectors (such as RJ-11), connected to in-wall telephone-wiring, hence being part of telephone outlet. As can be seen in FIG. 2, the faceplate 201 is designed to be coupled to the wall mounting fixture 105, by means of mechanical size and rectangular shape, intended to cover all fixture 105 cavity, and holes matched for screws 203 to fit threads 111.

The second commonly used wall mounting method is the "cylindrical cavity and sleeve" style as illustrated in FIG. 3. The cylindrical cavity and sleeve style is common in Europe and the Middle East and is used with a construction in which a wall section 301 is made of solid, or substantially solid masonry or similar rigid material which is self-supporting and requires no additional structural elements for stability. A cylindrical cavity 303 is formed in the wall section 301, and an optional sleeve 305 is inserted therein from the outside. The sleeve 305 is commonly of plastic or other semi-flexible material, and typically is in the shape of a cup with a lip and closed back. The sleeve 305 may also have mounting screws (not shown) for affixing to the wall section 301.

FIG. 4 shows a prior art wall mounting fixture device 401 for the cylindrical cavity and sleeve style of wall mounting. A pair of expandable clamps 403-a and 403-b is positioned to grip the inside of the sleeve 305 (FIG. 3), or alternatively the inside of the cavity 303 if no sleeve 305 is present. Cavities are typically cylindrical with an inside diameter of approximately 5.5 centimeters, but other cavity shapes and sizes are in general also possible. Clamp 403-a can be expanded outward to engage a grip on the inside of sleeve 305 (and subsequently increase the grip strength) by tightening a screw 405, and clamp 403-b can likewise be expanded outward for this purpose by a similar screw (not shown). It is also possible to use a single expandable clamp in conjunction with a fixed clamp or similar projection that is capable of gripping the inner surface of sleeve 305 or the inside of cavity 303 if no sleeve 305 is present. Once the wall mounting sure device 401 has been secured inside the cavity 303, the faceplate (not shown) may be fastened to attachment device 401 by means of screws driven into mounting holes 407-a and 407-b. It is to be noted that the nominal center distance between mounting holes 407-a and 407-b is six (6.0) centimeters, which is approximately 2.36 inches. The faceplate is also well suited to the wall mounting fixture, being of square shape, and having screw holes suitable for affixing the faceplate into the wall mounting fixture.

It is further noted that:

the prior art wall mounting fixture device as illustrated in FIG. 4 and described herein is capable of mounting substantially all commonly-used fixtures and outlets intended for cylindrical cavity and sleeve wall mounting;

all variations in the design and configuration of such prior art wall mounting fixture devices are minor, so that all such prior art wall mounting fixture devices are substantially identical in appearance, use, and function;

wall mounting fixtures and faceplates designed for the junction box style of wall mounting are incompatible with, and cannot be mounted in, cylindrical cavity and sleeve construction using the available prior fixture attachment devices (as illustrated in FIG. 4 and as described herein); and no means of readily mounting fixtures and outlets designed for the junction box style of wall mounting is currently available for cylindrical cavity and sleeve construction.

All common fixture and outlet types (such as electrical power outlets, telephone jacks, and lighting fixtures) are widely available for both of the above wall mounting styles. Thus, regardless of which style of wall mounting is employed within a building, it is easy to obtain these common fixtures and outlet types for that wall mounting style.

Many specialized fixtures and outlets, however, are now becoming available for specific purposes. Non-limiting examples of such specialized fixtures and outlets include outlets for data networking, multi-media, sensors, control units, and the like. Such fixtures and outlets may not be readily available for both wall mounting styles. In general, such specialized wall mounting fixtures and faceplates tend to be available for the wall mounting style that is prevalent in the region where their most important market is located. In particular, because of the size and importance of the North American market, most such specialized wall mounting fixtures and faceplates tend to be available primarily for the junction box style of wall mounting, as illustrated in FIG. 1 and FIG. 2. In many cases, such specialized wall mounting fixtures and faceplates are not available for the cylindrical cavity and sleeve style. Where this is the case, specialized wall mounting fixtures and faceplates cannot easily be installed in buildings whose construction utilizes the cylindrical cavity and sleeve style of wall mounting without expensive and unsightly external retrofitting of junction boxes 105 within the smaller cavities 303 provided for the sleeves 305, and therefore the utility provided by such specialized wall mounting fixtures and faceplates is difficult and expensive to provide for those buildings.

There is thus a widely recognized need for, and it would be highly advantageous to have, an adapter which provides easy installation of faceplates designed for the junction box style of wall mounting in buildings whose construction utilizes the cylindrical cavity and sleeve style of wall mounting. More generally, there is a need for an adapter allowing a faceplate of one style to be installed in a cavity suitable for another distinct style. This goal is met by the present invention.

SUMMARY OF THE INVENTION

The present invention provides an adapter that permits mounting a fixture or outlet designed for the junction box style of wall mounting to be installed in a cylindrical or other shaped cavity, with or without a sleeve.

The adapter according to the present invention readily installs into a wall cavity with or without a sleeve, and accepts the attachment of a fixture or outlet designed for the junction box style of wall mounting.

Therefore, according to the present invention there is provided an adapter for mounting a faceplate of a first style on to an outlet cavity of a second style, the adapter comprising:

a plate having an opening for passing therethrough media for connecting to at least one connector mounted in said faceplate, at least one fastener fixed to the plate for fixedly attaching the adapter to the outlet cavity; and at least one mounting point for attaching the faceplate thereto.

Preferably, a pair of spaced apart mounting points are provided in the plate separated by a distance of substantially 3¼ inches, conforming to the mutual separation between corresponding mounting holes of commercially available junction box faceplates.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
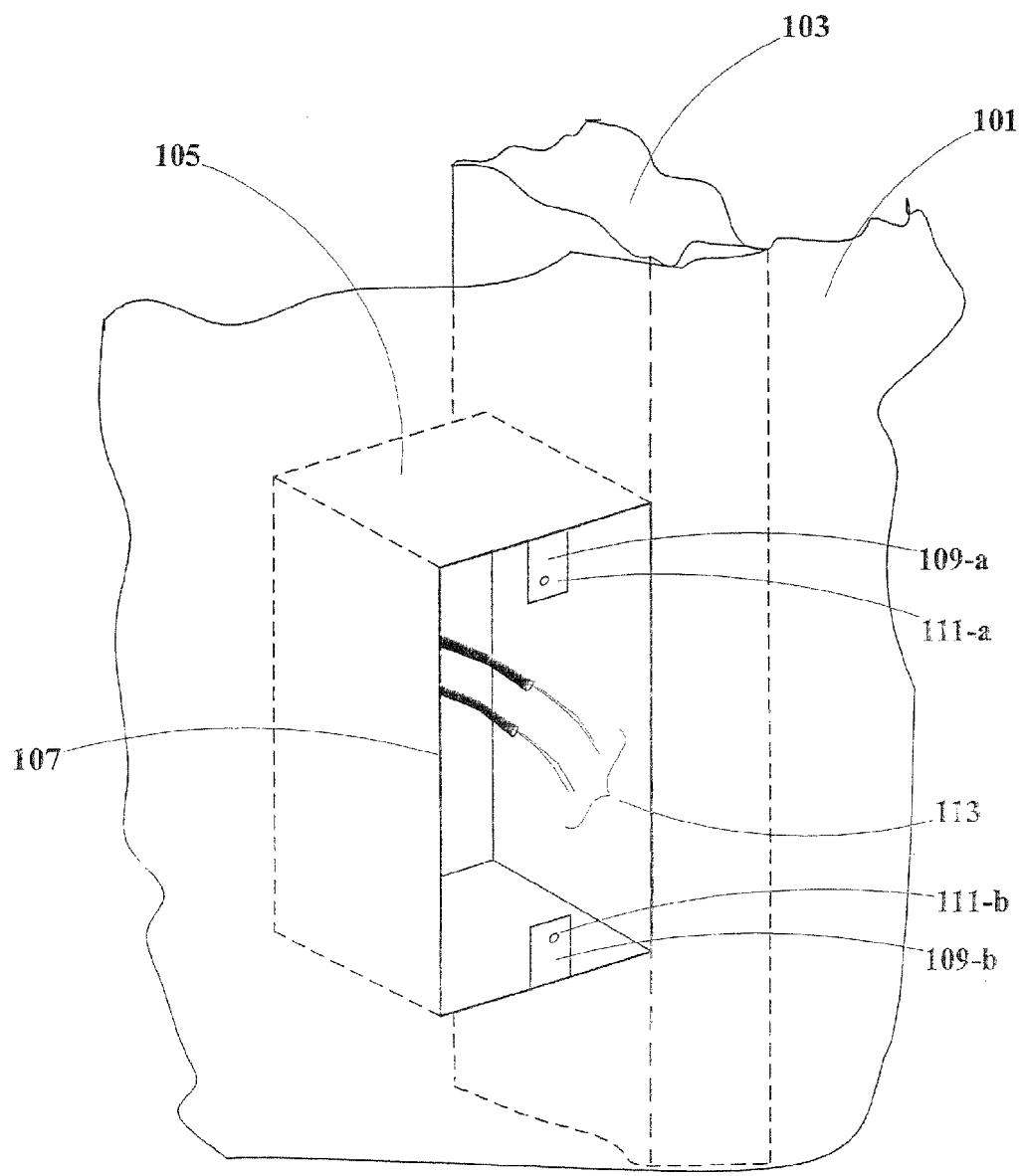
FIG. 1 illustrates the prior art junction box style of wall mounting fixture.
Figure 2:
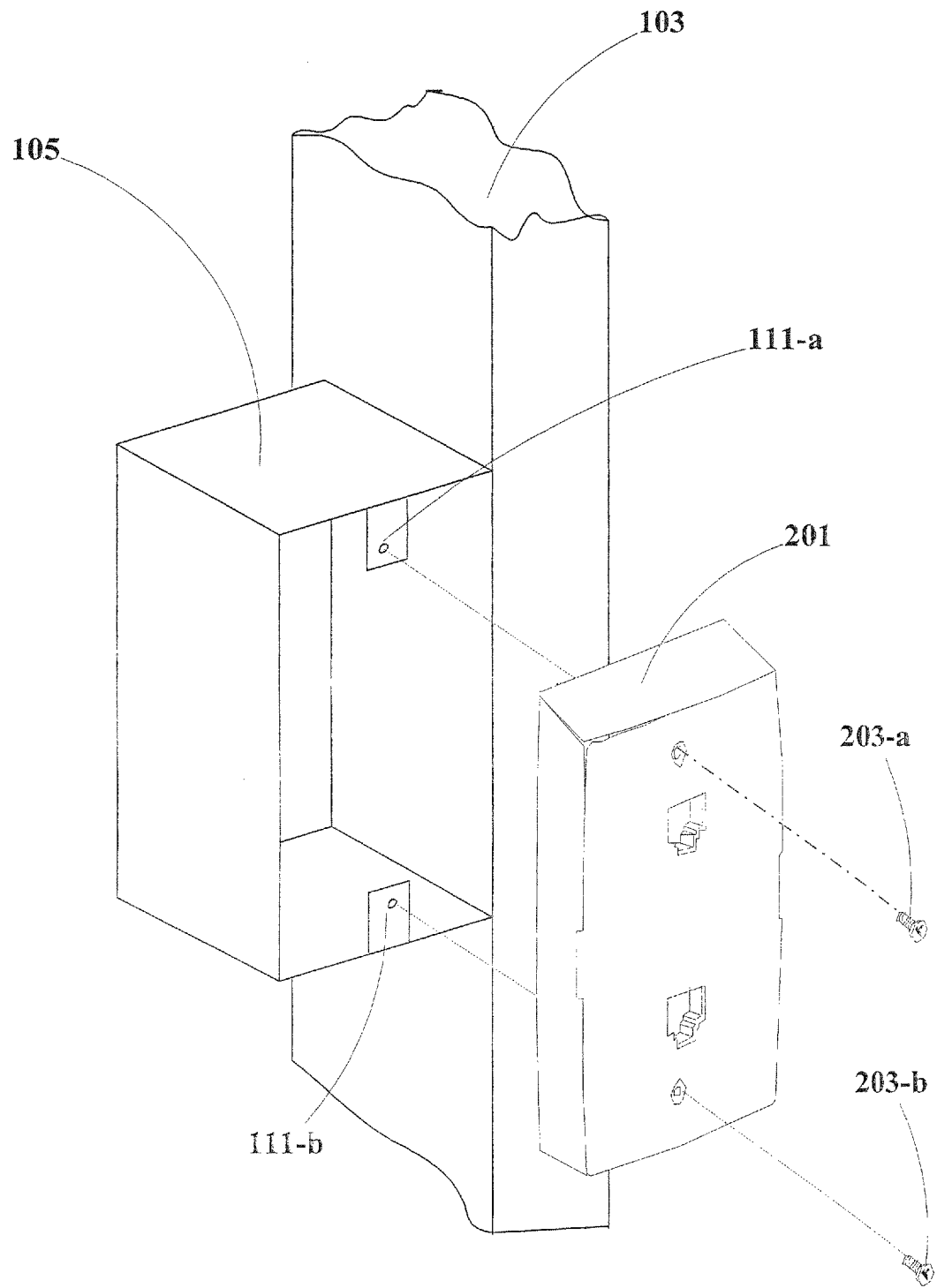
FIG. 2 illustrates the prior art installation of a faceplate onto a junction box style wall mounting fixture.

The principles and operation of an adapter according to the present invention may be understood with reference to the drawings and the accompanying description, wherein components that are common to different embodiments are referenced by identical reference numerals.

Figure 3:
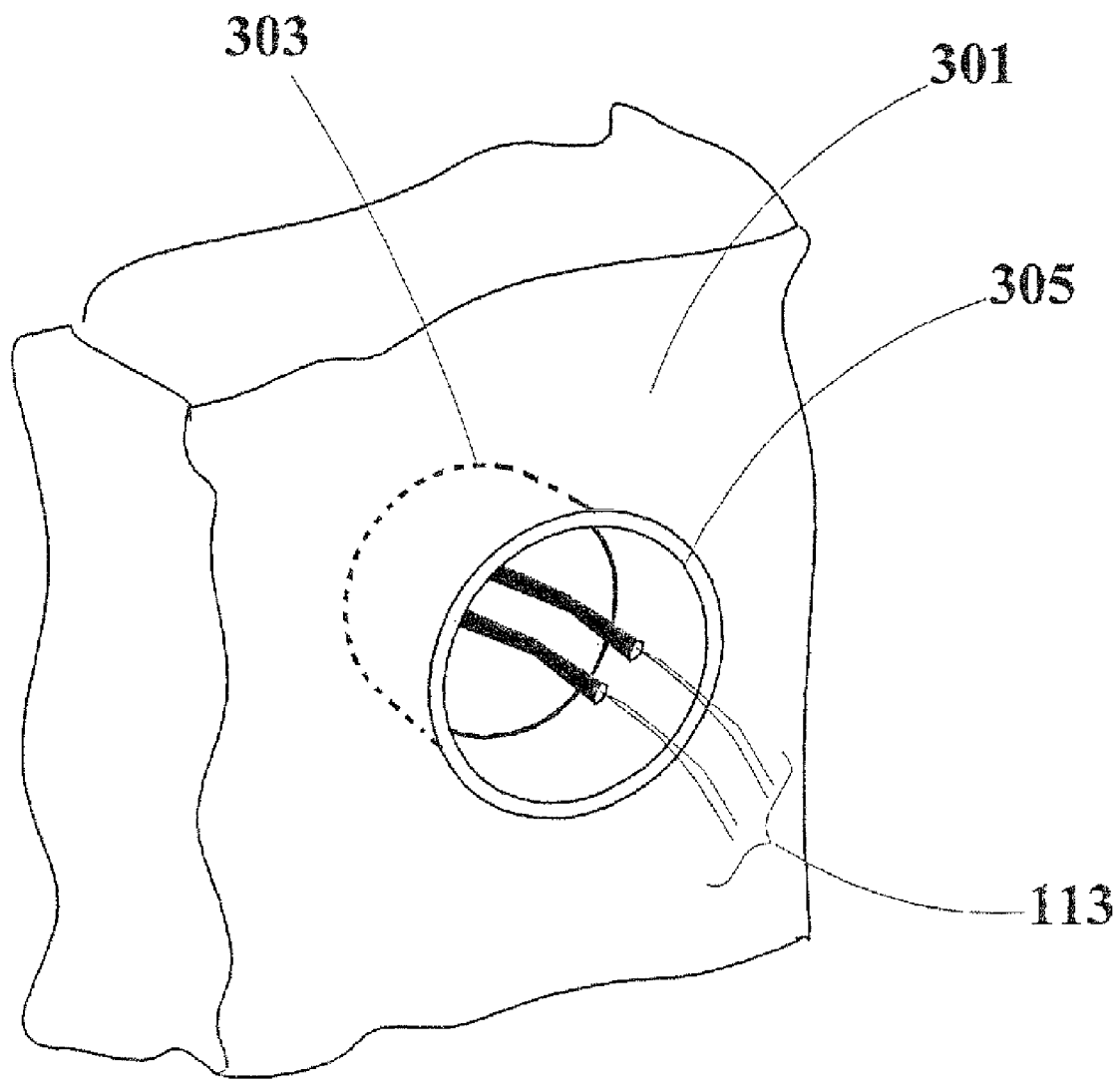
FIG. 3 illustrates the prior art cylindrical cavity and sleeve style of wall mounting cavity.
Figure 4:
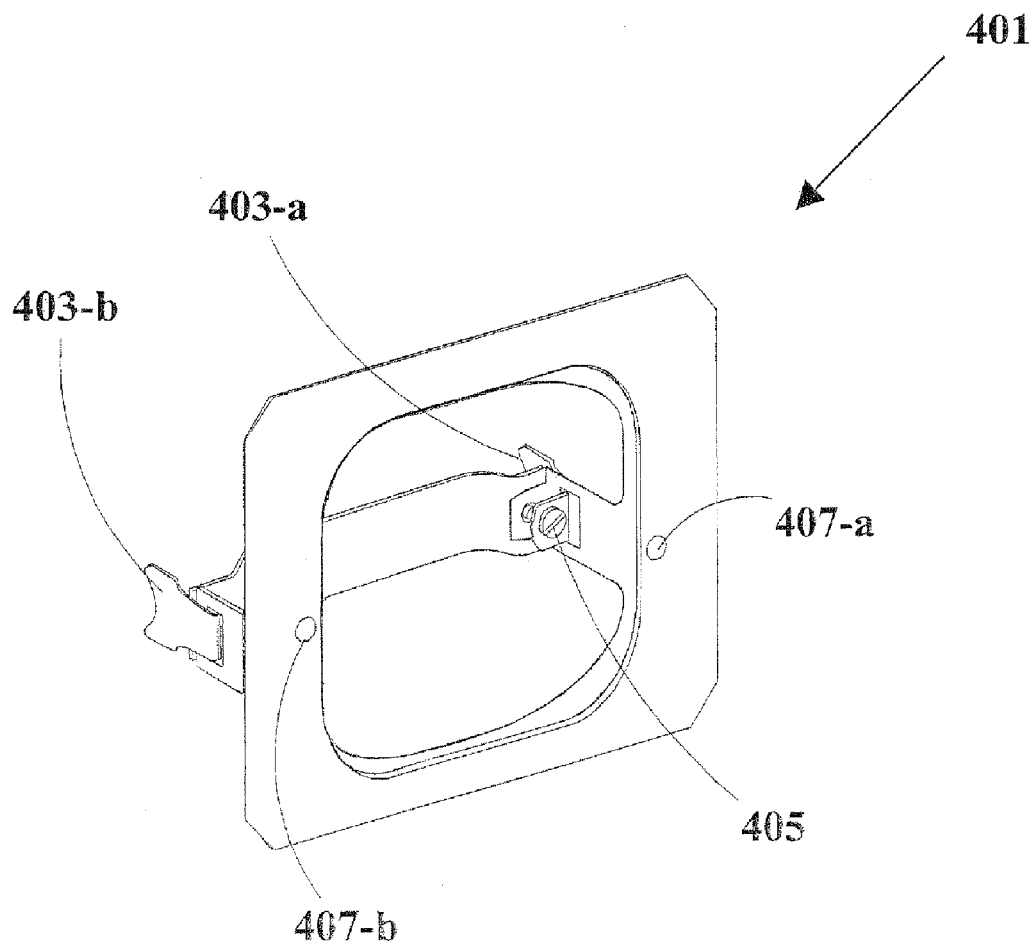
FIG. 4 illustrates a prior art wall mounting fixture device for the cylindrical cavity and sleeve style.
Figure 5:
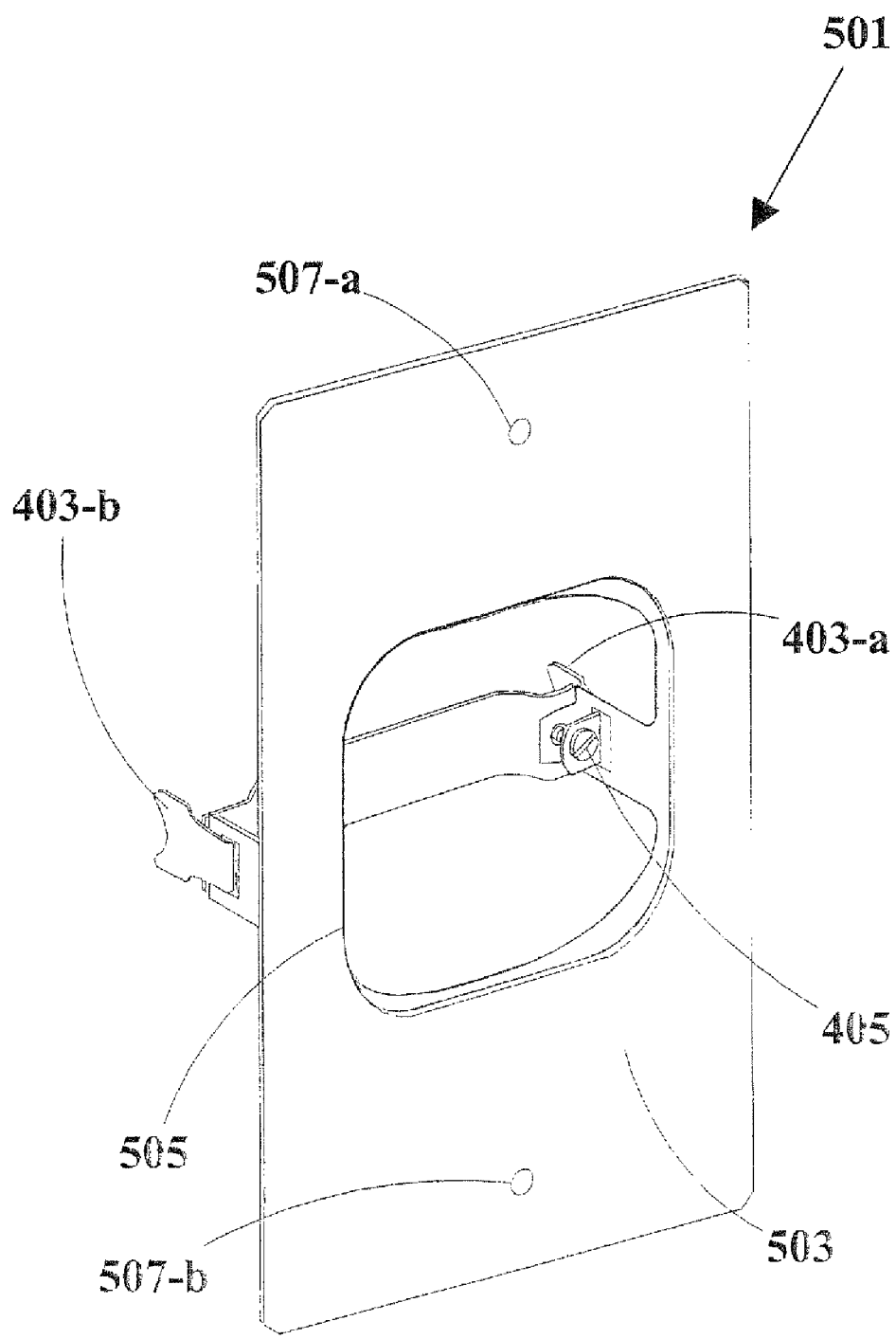
FIG. 5 illustrates an adapter according to the present invention for installing a faceplate designed for the junction box style to a wall mounting fixture in a cylindrical cavity.

FIG. 5 illustrates an adapter 501 having a rectangular plate 503 with an opening 505 for passing media 113 (FIG. 3) therethrough and having expandable clamps 403-a and 403-b, constituting a first style of attachment, for gripping to the interior surface of a wall cavity or sleeve, such as cavity 303 or sleeve 305 of a first shape, shown in FIG 3. A screw 405 expands clamp 403-a, and a similar screw (not shown)

expands clamp 403-b. Mounting points 507-a and 507-b constituting a second style of attachment different from the first style of attachment permit attachment of a faceplate designed for the junction box style of wall mounting. Such a faceplate is rectangular faceplate 601 shown in FIG. 6, this faceplate having a second shape different from the first shape, Accordingly, the nominal center distance between mounting points 507-a and 507-b is substantially three and one-quarter (3¼) inches. Non-limiting examples of mounting points 507-a and 507-b include holes and posts, which may be threaded as well as friction or snap-fit.

Figure 6:
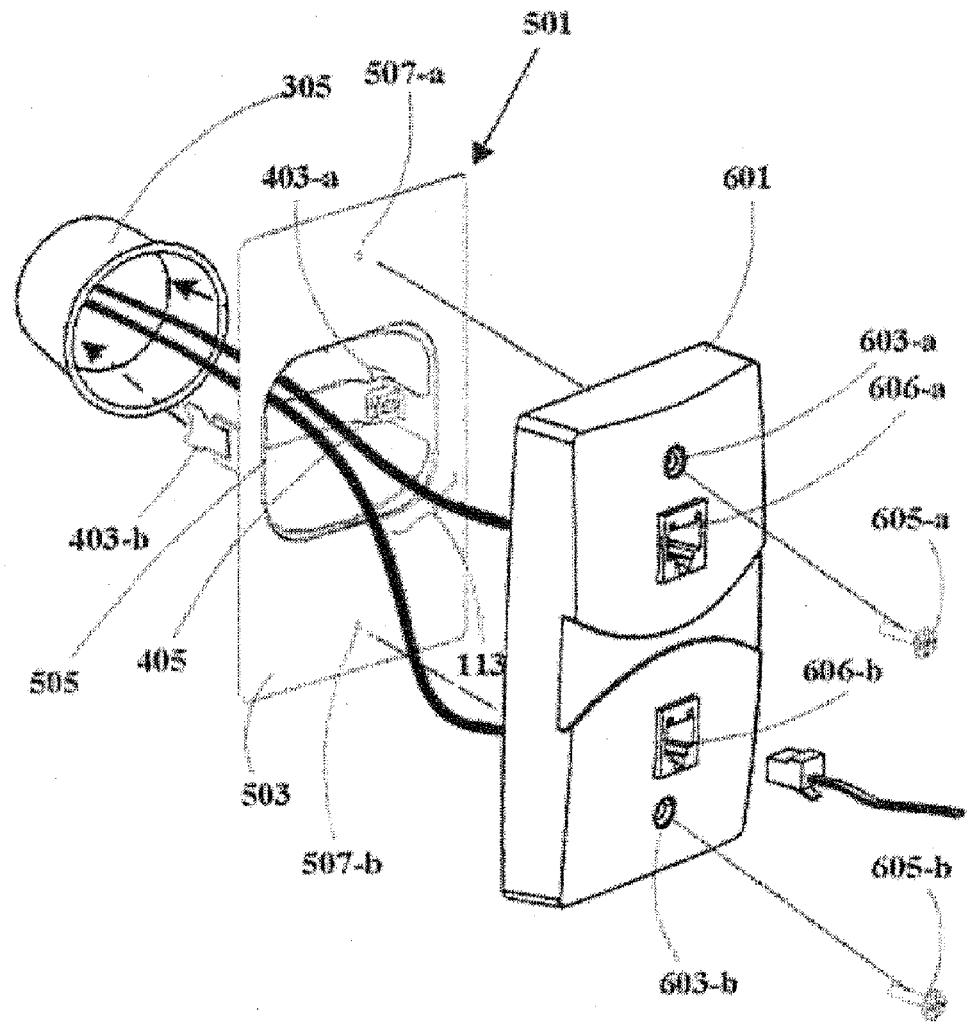
FIG. 6 illustrates the installation of a outlet faceplate onto an adapter according to the present invention into a cylindrical cavity sleeve.

FIG. 6 illustrates the mounting of an faceplate 601 designed for junction box style mounting on to adapter 501, which inserts into sleeve 305 and attaches therein with clamps 403-a and 403-b when the respective screws 405 are tightened (for clarity, wall section 301 is not shown). Having thus been securely fastened, the adapter 501 is then ready for the mounting of faceplate 601 against the rectangular plate 503. Faceplate 601 has mounting holes 603-a and 603-b, into which screws 605-a and 605-b, respectively, are passed and affixed into mounting points 507-a and 507-b, respectively, which may for example be threaded screw holes. Prior to mounting, media 113 is passed through opening 505 for connection to an appropriate device (not shown) fixed within the faceplate 601.

In the manner illustrated in FIG. 6 and described above, a customized faceplate designed for junction box mounting can be flush mounted neatly and easily on a wall featuring the cavity and sleeve style of wall mounting.

Figure 7:
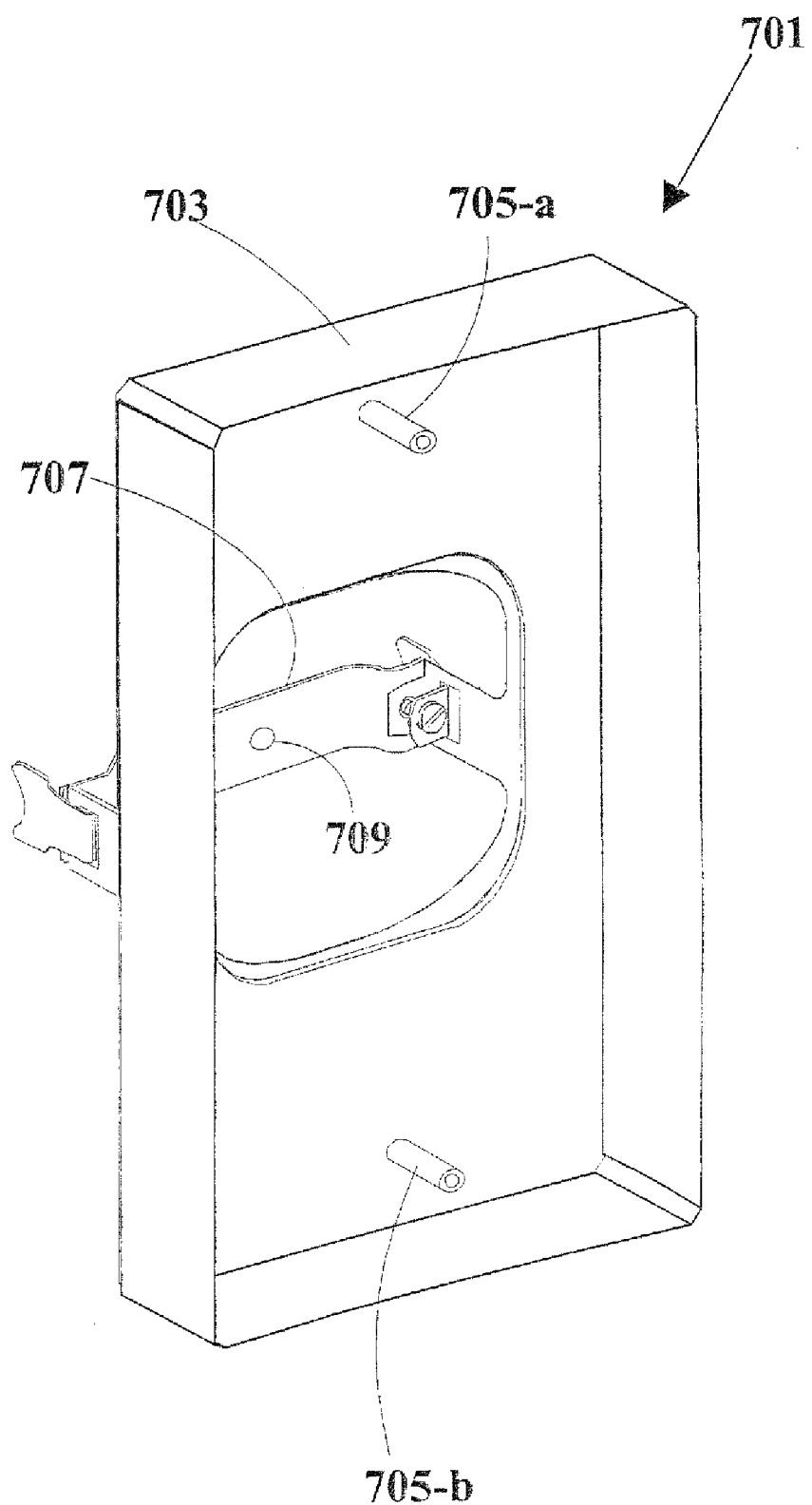
FIG. 7 illustrates an embodiment of the present invention having boxed sides and mounting posts.

Faceplate 601 as illustrated in FIG. 6 has a raised body intended for surface mounting on a wall such that the plate 503 mounts flush against the wall. An alternative embodiment of the present invention, however, is for mounting faceplates and other fixtures intended for mounting inside a junction box. FIG. 7 illustrates such an adapter wherein the plate 503 shown in FIG. 6 serves as a back plate supporting around a perimeter thereof a generally boxlike construction comprising outer sides 703 forming a junction box, and accommodating therein mounting points 705-a and 705-b in the form of raised posts. The raised posts have a threaded bore for threadably attaching the faceplate 601 thereto. The outer sides 703 are positioned so that when mounted, the adapter gives an appearance of a junction box flush to the wall. Outer sides 703 can be made with a variety of heights, so that a shallow and more attractive junction box is possible.

While the invention has been so far described with respect to a rectangular, junction-box style faceplate mounted into circular wall cavity, it will be appreciated that the invention can be equally applied to any case wherein a faceplate of one style is required to be mounted on to an outlet cavity conforming to a different style.

Likewise, while the invention has been described with respect to a limited number of embodiments, it will be appreciated that many variations, modifications, and other applications of the invention may be made. All such embodiments are contemplated as fall within the scope of the appended claims.

Thus, for example, although a pair of spaced apart clamps is shown in FIGS. 6 and 7 for fixing the adapter to the outlet cavity or sleeve, it will be appreciated that other means of attachment are possible. For example, an aperture may be formed in the plate 503 at a location that falls within the circumferences of the cavity 303 or the sleeve 305, thus allowing the plate to be screwed to the wall 101 through the cavity 303: or the sleeve 305. Likewise, in FIG. 7, the clamps are interconnected by an armature shown as 707 and having a central aperture 709, thus again allowing the plate to be screwed to the wall 101 through the cavity 303 or the sleeve 305 and obviating the need for the clamps.

The faceplate 601 shown in FIG. 6 includes a pair of apertures 606-a and 606-b each for accommodating a respective connector. Such connector can include a telephone connector, 609-a, 609-b, as shown in FIG. 6, a power/electricity connector or a CATV connector. In the case that the faceplate 601 accommodates multiple apertures (which is not mandatory), the apertures may, if desired, by of different contours so as to allow different types of connector to be mounted therein. By such means, for example, a telephone connector and a computer data connector can be accommodated in the same connector and connected to appropriate media, the faceplate 601 being fixed to the cavity 303 or to the sleeve 305 via the adapter 501 or 701.

The invention also contemplates a method for installing a faceplate of a first style into an electrical outlet cavity of a second style, the method comprising:

(a) mounting to the outlet cavity an adapter according to the invention, (b) connecting the media to at least one connector mounted in the faceplate of the adapter, and (c) fixing the faceplate to the adapter via the at least one mounting point.

Likewise, the invention contemplates an electrical outlet comprising a faceplate of a first style mounted on to an outlet cavity of a second style via an adapter according to the invention.

What is claimed is:

1. A modular outlet for coupling a signal carried over wiring in walls of a building to and from an apparatus, the wiring being accessed via a wall outlet opening or cavity of a first shape, wherein:

said outlet comprising a faceplate having a second shape different from the first shape and an adapter configured to be interposed between said faceplate and the outlet cavity or opening;

said faceplate comprises a connector for connecting to the apparatus;

said adapter is directly mountable into the wall outlet opening or cavity and is securely attachable to the wall outlet opening or cavity using a first style of attachment comprising at least one clamp for engaging an inner surface of the outlet cavity or opening;

wherein:

said faceplate is mechanically attached to the adapter and secured to the adapter using a second style of attachment, said second style of attachment being different from said first style of attachment and comprising at least one of: holes; screws; threaded posts; friction-fit posts; and snap-fit posts;

the wiring is arranged to pass through said adapter and to be coupled to said connector for coupling the signal carried over the wiring to and from the apparatus; and said adapter has a substantially continuous, peripheral raised edge to form a box structure.

2. The modular outlet according to claim 1, wherein the wiring includes a telephone wire pair connected to carry a telephone signal, the wall outlet opening or cavity is a standard telephone outlet wall opening or cavity, and said connector is a telephone connector.

3. The modular outlet according to claim 1, wherein the wiring includes a cable television coaxial cable connected to carry a cable television signal, the wall outlet opening or cavity is a standard cable television wall outlet opening or cavity, and said connector is a coaxial connector.

4. The modular outlet according to claim 1, wherein the wiring includes alternating current power wires connected to carrying an alternating current power signal, the wall outlet opening or cavity is a standard alternating current power wall outlet opening or cavity, and said connector is an alternating current jack.

5. The modular outlet according to claim 1, wherein the wiring includes data network wiring, the wall outlet opening or cavity is a standard data network wall outlet opening or cavity, and said connector is a data connector.

6. The modular outlet according to claim 1, wherein the first shape is circular.

7. The modular outlet according to claim 6, wherein the second shape is rectangular.

8. The modular outlet according to claim 1, wherein said adapter comprises a pair of spaced apart clamps for engaging an inner surface of the outlet cavity or opening.

9. The modular outlet according to claim 1, further comprising means for attaching said faceplate to said adapter, said means comprising at least one of: holes; threaded posts, friction-fit posts and snap-fit posts.

10. The modular outlet according to claim 1, wherein the faceplate is mountable to the wall outlet opening or cavity using wall mounting elements substantially similar to those of a standard wall outlet.

11. The modular outlet according to claim 1, wherein said outlet has a form substantially similar to that of a standard outlet.

12. The modular outlet according to claim 1, wherein the wall outlet cavity or opening is configured according to a first geographic region style, and said faceplate is shaped to be mounted onto a wall outlet cavity or opening shaped according to a second geographic region style.

13. The modular outlet according to claim 1, wherein the first style is used in Europe and the Middle East and the second style is used North America.

14. The modular outlet according to claim 1, wherein said adapter comprises a back plate and said raised edge projects from said back plate.

15. The modular outlet according to claim 14, wherein said adapter further comprises raised posts constituting mounting points for said faceplate and forming components of the second style of attachment.

16. The modular outlet according to claim 15, wherein each of said raised posts has a threaded bore for threadably attaching said faceplate to said adapter.

17. The modular outlet according to claim 16, wherein said adapter forms a junction box.

18. The modular outlet according to claim 1, wherein said adapter forms a junction box.

\* \* \* \* \*